United States Patent [19]
Mazel

[11] 3,854,282
[45] Dec. 17, 1974

[54] KEY FOR MASTER CHAIN LINK

[76] Inventor: Carlman Mazel, 10606 Jordan Ave., Chatsworth, Calif. 91311

[22] Filed: Dec. 26, 1973

[21] Appl. No.: 428,213

[52] U.S. Cl. ......................................... 59/7, 81/3 R
[51] Int. Cl. ............................................. B21l 21/00
[58] Field of Search ................. 59/7, 11; 29/200 H; 81/3 R

[56] References Cited
FOREIGN PATENTS OR APPLICATIONS
1,111,759  11/1955  France .................................. 59/7

Primary Examiner—C. W. Lanham
Assistant Examiner—Gene P. Crosby

[57] ABSTRACT

A key for opening the clip on the master link of a link chain wherein the key has a shank wider at the free end than the gap between the arms of the clip and the shank has a cam in its side edge, which causes one arm to be elevated and pivoted over the end of the pin to free the clip from the master link pins when the key is turned with its shank perpendicular to the arms.

3 Claims, 4 Drawing Figures

PATENTED DEC 17 1974 3,854,282

KEY FOR MASTER CHAIN LINK

This invention relates to link chains and more particularly comprises a new and improved key for opening the master link.

BACKGROUND OF THE INVENTION

Opening the master links of link chains can be difficult and awkward, particularly if the chain is heavily coated with grease. There are no convenient and inexpensive tools available for that purpose. Consequently it is customary to use a screw driver and/or pliers to open the master link clip, and neither works wholly satisfactory. It is not enough merely to spread the arms of the master link clip because that only serves to free one side of the clip from the slot in the chain cross pin, and the pin remains engaged by the other side of the clip and cannot be pulled out of the roller so as to dismantle the link. It is necessary to remove both arms of the clip from the pin groove so that the clip can be completely removed from both pins which in turn allows removal of the link.

The present invention comprises a key which serves both to spread the arms of the clip and to remove the arms from the pin slot so that the pin is free and may be pulled. In accordance with this invention, the key is very inexpensive. Preferably it has a flat shank made of metal or some other sufficiently rigid material having a width at its free end slightly larger than the space between the arms of the clip when the clip is in its locked position on the link and pins. A cam is formed in the side of the shank immediately adjacent the free end on which the clip arm engaged by that side of the shank rides and rises out of the groove in the pin and over the end of the pin, when the key is turned.

BRIEF FIGURE DESCRIPTION

DETAILED DESCRIPTION

Figure 1:
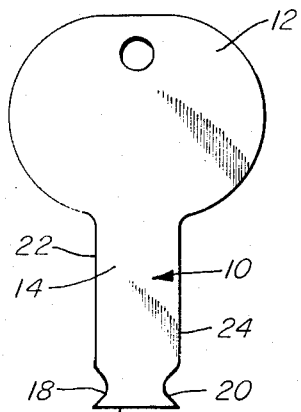
FIG. 1 is a plan view of the chain key constructed in accordance with this invention.

The key 10 shown in the drawing has a head 12 and shank 14. The free end 16 of shank 14 is provided with a pair of cams 18 and 20 in its side edges 22 and 24, respectively, for purposes which are made clear in the following description and in the drawings.

Figure 2:
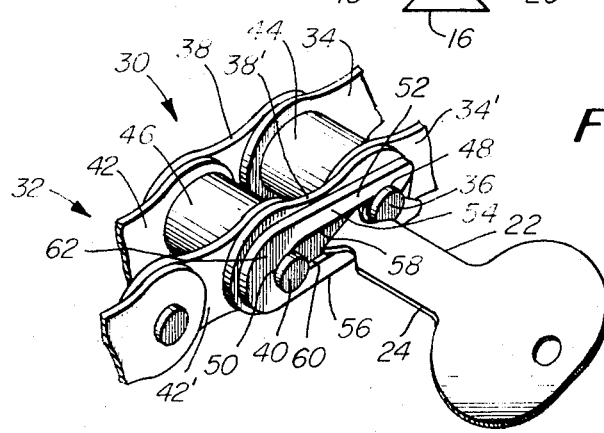
FIG. 2 is a perspective view of the chain showing the key in position just prior to turning to free the clip.
Figure 3:
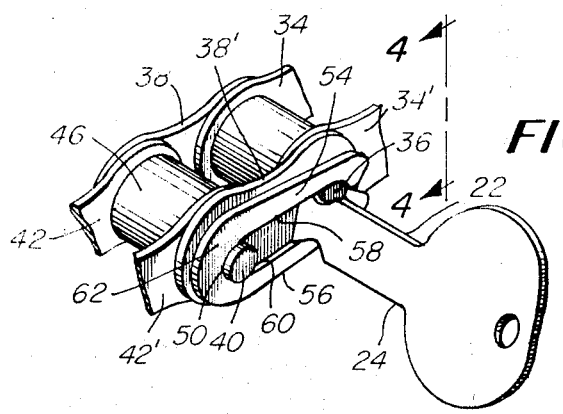
FIG. 3 is a view similar to FIG. 2 but showing the key turned to actually free the clip.
Figure 4:
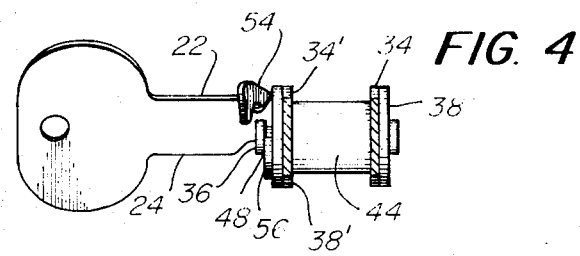
FIG. 4 is an end view showing the clip in the position of FIG. 3, freed from the chain pin.

FIGS. 2 and 3 illustrate a typical master link 30 of a link chain 32. In the segment of the chain shown, pairs of links 34 and 34' are joined by pin 36 to the pair of links 38 and 38', which in turn are joined by pin 40 to the pair of links 42 and 42'. The pins 36 and 40 carry rollers 44 and 46 between the respective links. The pins 36 and 40 on the side not shown typically are headed, and the ends shown bear grooves 48 and 50 adjacent their ends, which cooperate with the clip 52 to lock the chain. The master link is disassembled by removing clip 52 from the pins 36 and 40 and withdrawing the pins from the links.

In FIG. 2, key 10 is shown with its free end 16 bearing against the face of link 38' between pins 36 and 40 and between the arms 54 and 56 of the clip. The width of the end 16 of the shank 14 is greater than the gap between the inner edges 58 and 60 of arms 54 and 56, and consequently, to position edge 16 against the face of link 38' it is necessary to incline the key shank as shown, wherein the plane of the shank 14 is not perpendicular to the edges 58 and 60. When key 10 is rotated approximately 45° counterclockwise from the position shown in FIG. 2 to that shown in FIG. 3, arms 54 and 56 are spread apart somewhat by the wedging action of the shank, the clip acting as a spring and spreading about its closed end 62. Because edge 22 of shank 14 engages the arm 54 a greater distance from closed end 62 than does edge 24 engage arm 56, when the arms are spread apart by the twisting of the shank, arm 56 tends to remain in the position shown in FIG. 2 while the arm 54 moves out of groove 48, away from the axis of pin 36. When arm 54 is removed from groove 48 by that action, it is free to ride up on cam 18 in edge 22 so that it effectively is lifted from the plane of the other arm 56. Consequently the arms of the clip are no longer confined by groove 48, and the clip may be pivoted away from pin 36, and the pin may be withdrawn. Moreover, the closed end 62 of the clip may be slipped off the pin 40 because the arms are not confined by the other pin.

From the foregoing description it will be appreciated that the very simple key of this invention by being placed in the position shown in FIG. 2 and then being rotated approximately 45° completely frees the clip of the master link from the chain so that the chain in turn may be opened. The key may be manufactured very inexpensively and be given as a premium with any device on which a link chain is used.

Those skilled in the art will appreciate that numerous modifications may be made of this invention without departing from its spirit. Therefore, I do not intend to limit the breadth of this invention to the single embodiment illustrated and described. Rather, it is my intention that the scope of this invention be determined by the appended claims and their equivalents.

I claim:

1. A key for removing the clip on a master link wherein the clip is generally U-shaped having two arms with the closed end of clip at the joined end of the arms engaging a groove in and adjacent the end of one cross pin and the open end of the clip at the free end of the arms engaging a groove in and adjacent the end of another cross pin, comprising, a shank having a handle at one end, said shank being wider in one direction than the gap between the arms when the free ends of the arms engage the groove in the other pin and spreading the arms when the width of the shank lies perpendicular to said arms so that the free end of at least one arm disengages the groove in said other pin, and at least one cam surface in the shank immediately adjacent the other end for engaging one of said arms and lifting it beyond the end of said other pin when the width of the shank is turned between the arms to a plane perpendicular to the pins.

2. A key as described in claim 1 further characterized by a cam being provided on each side of the shank immediately adjacent said other end of the shank.

3. A key as described in claim 2 further characterized by said key being flat and with the cams lying in the side edges of the shank.

* * * * *